United States Patent
Steiner

(10) Patent No.: US 9,763,044 B2
(45) Date of Patent: Sep. 12, 2017

(54) METHOD, SYSTEM AND APPARATUS FOR ENABLING LOCATION DETERMINATION USING MULTIPLE SIMULTANEOUS LOCATION DATABASES

(71) Applicant: Intel IP Corporation, Santa Clara, CA (US)

(72) Inventor: Itai Steiner, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/487,176

(22) Filed: Sep. 16, 2014

(65) Prior Publication Data
US 2016/0077188 A1     Mar. 17, 2016

(51) Int. Cl.
*H04W 4/02*     (2009.01)
*G01S 5/02*     (2010.01)
*G01S 5/14*     (2006.01)

(52) U.S. Cl.
CPC ........... *H04W 4/023* (2013.01); *G01S 5/0236* (2013.01); *G01S 5/0252* (2013.01); *G01S 5/0263* (2013.01); *G01S 5/14* (2013.01)

(58) Field of Classification Search
CPC ........ G01S 5/0257; G01S 5/0263; G01S 5/14; G01S 5/0236; G01S 5/10; G01S 5/0252; H04W 4/023
See application file for complete search history.

(56) References Cited

U.S. PATENT DOCUMENTS

| | | | | |
|---|---|---|---|---|
| 7,312,752 B2* | 12/2007 | Smith | ..................... | G01S 5/021 342/464 |
| 7,525,484 B2* | 4/2009 | Dupray | ................... | G01S 1/026 342/450 |
| 8,106,819 B1* | 1/2012 | Rahman | .................. | G01S 19/34 342/357.4 |
| 8,938,211 B2* | 1/2015 | Das | ......................... | H04W 4/04 370/338 |
| 2008/0227467 A1* | 9/2008 | Barnes | ............... | G06Q 30/0259 455/456.2 |
| 2009/0322603 A1* | 12/2009 | Liao | .......................... | G01S 5/10 342/357.29 |
| 2009/0327102 A1* | 12/2009 | Maniar | ................. | G06F 19/327 705/28 |
| 2010/0309059 A1* | 12/2010 | Wu | ........................ | G01S 13/878 342/463 |
| 2010/0311436 A1* | 12/2010 | Bevan | ................... | G01S 5/0252 455/456.1 |
| 2011/0090124 A1* | 4/2011 | Liu | ........................ | G01S 5/0289 342/463 |
| 2011/0274094 A1* | 11/2011 | Jovicic | .................. | G01S 5/0278 370/338 |
| 2012/0130632 A1* | 5/2012 | Bandyopadhyay | .... | G01C 17/38 701/446 |

(Continued)

*Primary Examiner* — Kenneth Lam
(74) *Attorney, Agent, or Firm* — Alpine Technology Law Group LLC

(57) ABSTRACT

Examples are disclosed for techniques for a new method of calculating multiple locations of a wireless communication device based on the same or a subset of the same raw data measurements (such as WiFi Time-Of-Flight/Fine-Time-Measurements or RSSI) and client specific fixed location device locations sources and/or database. Additionally, new APIs and implementation methods to support the new method are disclosed.

25 Claims, 4 Drawing Sheets

(56) References Cited

U.S. PATENT DOCUMENTS

| | | | | |
|---|---|---|---|---|
| 2013/0003572 A1* | 1/2013 | Kim | .................... | H04W 64/00 |
| | | | | 370/252 |
| 2013/0238857 A1* | 9/2013 | Daniel | .................. | H04W 4/008 |
| | | | | 711/118 |
| 2013/0317944 A1* | 11/2013 | Huang | .................. | G01S 5/0252 |
| | | | | 705/26.61 |
| 2014/0018111 A1* | 1/2014 | Farley | .................. | G01S 5/0252 |
| | | | | 455/456.6 |
| 2014/0249771 A1* | 9/2014 | Yang | .................... | G01C 21/206 |
| | | | | 702/150 |
| 2014/0364146 A1* | 12/2014 | Mirzaei | ................ | H04W 4/023 |
| | | | | 455/456.2 |
| 2015/0030157 A1* | 1/2015 | Segev | .................... | G01S 5/0027 |
| | | | | 380/270 |
| 2016/0003623 A1* | 1/2016 | Venkatraman | ......... | G01C 21/20 |
| | | | | 701/410 |
| 2016/0062949 A1* | 3/2016 | Smith | .................... | H04W 4/02 |
| | | | | 702/150 |

* cited by examiner

METHOD, SYSTEM AND APPARATUS FOR ENABLING LOCATION DETERMINATION USING MULTIPLE SIMULTANEOUS LOCATION DATABASES

TECHNICAL FIELD

The present disclosure relates generally to the field of wireless communications technologies. More particularly, the present disclosure relates to techniques for location determination using multiple simultaneous location databases and supporting multiple applications or clients.

BACKGROUND

Mobile devices have long had the ability to track their own location relative to the surface of the Earth through receipt and analysis of wireless signals from multiple global positioning system (GPS) or global navigation satellite system (GNSS) satellites. Thus, users of such computing devices, whether carried on their persons or installed within vehicles, have long been able to view a visual presentation of where they are on the surface of the Earth at any given moment. Further, beyond simply presenting location information such as a current set of coordinates, mobile devices have long incorporated location applications or clients (hereinafter clients) to make use of such location information in providing other services (for example, presenting weather predictions for a current location; presenting locations of shops or gas stations, along with their prices, etc., near a current position; presenting nearby realtor listings; and the like).

More recently, mobile devices provide the ability to track their own location relative to an interior of a venue (e.g., an interior of a mall, a store, an airport terminal, etc.) with a finer location accuracy level than possible using signals emanating from satellites, which may also not be able to penetrate portions of such structures to reach their interiors. This is typically done by receiving and analyzing wireless signals emanating from wireless network access points (APs) forming a location network within such a venue. Further, such mobile devices have recently come to incorporate location clients to cooperate with location services provided by such a location network to guide users to locations of particular items of interest within a venue, such as products available for purchase, new products and/or products for which promotions are offered within that venue.

Such location clients rely on a location provider of a mobile device that has been configured to interact with such location network providing such location services within a venue to determine a current location of the mobile device relative to an indoor map of rooms, hallways, aisles, shelves, kiosks, information desks, restrooms, and the like. The location provider then provides the current location to a location client associated with the indoor map of the venue and able to correlate items of interest to the locations at which those items of interest are offered within that venue. Such correlations are then used to guide a user to items of interest and/or to present promotions (e.g., discounts) associated with those items.

Indoor maps are very client dependent, as it is very difficult to snap the indoor map to absolute worldwide coordinates, and therefore, most of the indoor maps that are available are using local coordinates of an AP of the venue. When the AP location data and client mapping data come from different sources, significant error is often introduced, reducing the ability to provide high-level accuracy of the indoor location (for example, of less than 1 meter resolution).

Further, positioning technologies typically require the availability of accurate locations of APs or other fixed location devices in order to calculate and determine a devices location. However, it is highly complicated to measure a location of a fixed location device with high accuracy (for example of less than 50 cm) and therefore, many location databases are inaccurate or simply don't exist.

It is desirable to enable more accurate indoor location determination and reduce the potential representation error introduced by using AP location information and mapping information from different sources.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
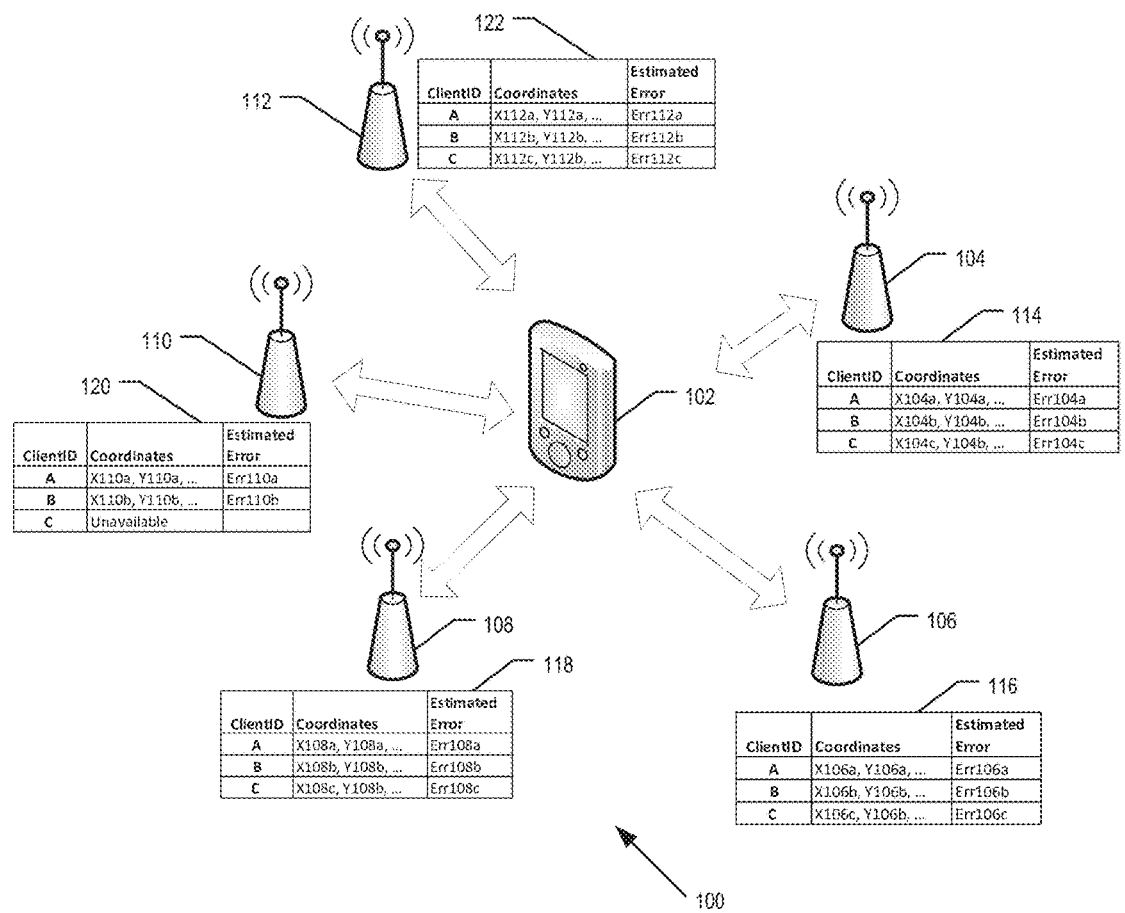
FIG. 1 illustrates a location determination network in accordance with some embodiments.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", and the like, indicate that the embodiment(s) of the invention so described may include particular features, structures, or characteristics, but not every embodiment necessarily includes the particular features, structures, or characteristics. Further, some embodiments may have some, all, or none of the features described for other embodiments.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information storage medium that may store instructions to perform operations and/or processes.

Various embodiments of the invention may be implemented fully or partially in software and/or firmware. This software and/or firmware may take the form of instructions contained in or on one or more computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Conversion from one form of code to another does not need to take place in real time, or by the processor that executes the code. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

The term "wireless" may be used to describe circuits, devices, systems, methods, techniques, communications channels, etc., that communicate data by using modulated electromagnetic radiation through a non-solid medium. The term "wireless device", as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and/or the data that has been received. The processor(s) may also process other data which is neither transmitted nor received.

As used within this document, the term "mobile device" is intended to cover those devices whose wireless communications are at least partially scheduled and/or controlled by a network controller. A mobile device (MD) may also be known as a mobile station (MS), STA, subscriber station (SS), user equipment (UE), or any other term that may arise to describe the functionality of a mobile device. Mobile devices may move during such wireless communications, but movement is not required. The term "station" (STA), as used herein, may include any logical entity that is a singly addressable instance of a medium access control (MAC) and a physical layer (PHY) interface to a wireless medium (WM).

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with standard wireless communications technologies such as devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012*)) and/or future versions and/or derivatives thereof, existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, existing WirelessHD™ specifications, and/or future versions and/or derivatives thereof, existing and/or Wireless Fidelity (WiFi) Alliance (WFA) Peer-to-Peer (P2P) specifications (*WiFi P2P technical specification, version 1.3, 2012*), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

FIG. 1 illustrates a location determination network 100 in accordance with some embodiments. Location determination network 100 includes a wireless communication device 102 and multiple fixed wireless location devices 104, 106, 108, 110, and/or 112. In some embodiments location determination network 100 is a wireless communications network, wherein wireless communication device 102 and one or more of fixed location devices 104, 106, 108, 110 and/or 112 are capable of communicating content, data, information and/or signals over a wireless communication medium, for example, a radio channel, an IR channel, a Radio Frequency (RF) channel, a Wireless Fidelity (WiFi) channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and/or the like.

In some embodiments, wireless communication device 102 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a smart phone, a cellular telephone, a PCS device, a PDA device which incorporates a wireless communication device, or the like. Wireless communication device 102 may incorporate multiple location determination methods (e.g., GPS, GNSS, motion sensing, triangulation from signal sources, received signal strength indicator (RSSI) or 802.11 or WiFi fine timing measurement (FTM) Time-Of-Flight (TOF) data measurements and/or the like.

Fixed locations devices 104, 106, 108, 110 and/or 112 may be wireless Access Points (APs) or any other such fixed location device that can communicate wirelessly with wireless communication device 102 such that wireless communication device 102 can obtain raw data measurements of the communications for use in location determination. Typical raw data measurements used in location determination methods include, but are not limited to, fine timing measurement (FTM) Time-Of-Flight (TOF) or received signal strength indicator (RSSI) data measurements of communications received from fixed wireless location devices 104-112 by wireless communication device 102. Location determination network 100 may include more or less fixed location devices, but typically, data measurements from at least three of fixed location devices 104-112 are needed for accurate location determination of wireless communication device 102.

In accordance with some embodiments, location determination calculations utilize fine timing measurements made by the wireless communication device 102 and by at least three of fixed location devices 104-112. As such, a wireless communication device 102 captures raw data measurements from wireless communications from each of at least three of fixed location devices 104-112 and each of at least three of fixed location devices 104-112 capture raw data measurements from wireless communications from wireless communication device 102.

Fixed location devices 104-112 may be associated with location information data sets 114-122, respectively. Each of data sets 114-122 may include multiple client specific location coordinates of the fixed location device and other characteristics such as estimated error for each of a variety of applications or clients (hereinafter clients) that may or may not be running on wireless communication device 102. The different client specific location coordinates per fixed location device reflects the different location grids or map per client. By utilizing the same location coordinate "language" of coordinates for multiple fixed location devices, a client may gain significant accuracy in location determination. Some of the data sets 114-122 may not have associated client specific location coordinates and other characteristics for a particular client running on wireless communication device 102. If so, such associated fixed location device may be considered untrusted and raw data measurements from communications with the fixed location device are typically not used for location determination for the particular client. As illustrated, data set 120 associated with fixed location device 110 does not contain client specific location coordinates and other characteristics for Client C. Thus, fixed location device 110 may be considered untrusted with respect to Client C. In some embodiments, location coordinates may be standardized or support multiple different clients.

In accordance with some embodiments, location information data sets 114-122 may be included or stored on wireless communication device 102. Such datasets may be from a client loaded on wireless communication device 102, downloaded from a network database, and/or downloaded from fixed location devices 104-112.

Multiple clients that utilize location determination may be simultaneously active or loaded on wireless communication device 102. Wireless communication device 102 may receive from clients or may download one or more of the location coordinate data sets 114-122 from fixed location devices 104-112, respectively, and use the appropriate location coordinates and raw data to determine location. Note that wireless communication device 102 can use the same raw data measurements for location calculations supporting multiple clients, thus reducing the need for raw data measurements on a per client basis.

Figure 2:
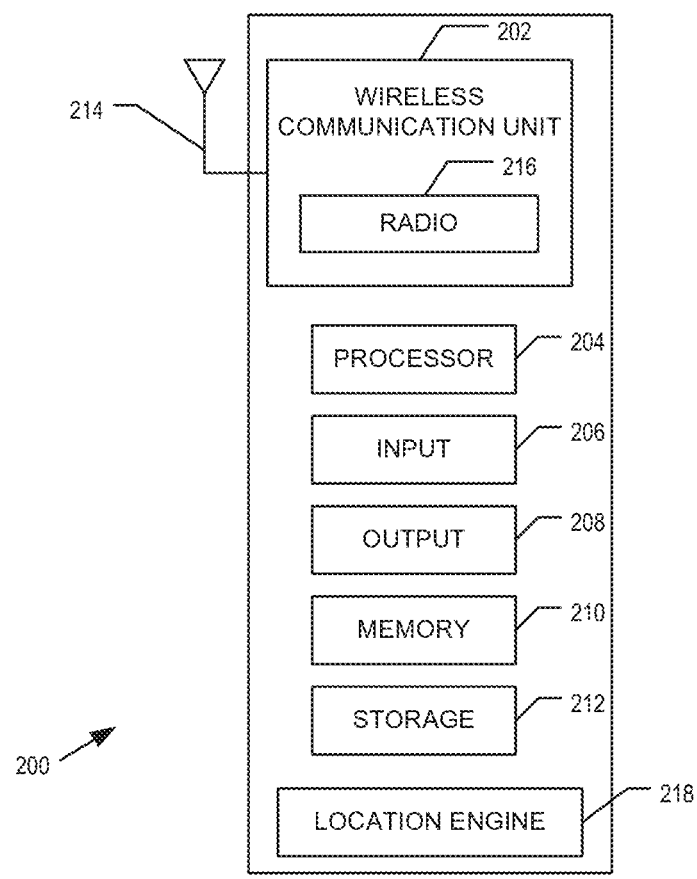
FIG. 2 illustrates a wireless communication device in accordance with some embodiments.

FIG. 2 illustrates a wireless communication device 200 in accordance with some embodiments. In some embodiments, wireless communication device 200 includes a wireless communication unit 202 to perform wireless communication between other wireless communication devices. Wireless communication device 200 may also include, for example, one or more of a processor 204, an input unit 206, an output unit 208, a memory unit 210, and a storage unit 212. Wireless communication device 200 may optionally include other suitable hardware components and/or software components.

In some embodiments, some or all of the components of one or more of wireless communication device 200 may be enclosed in a common housing or packaging, and may be interconnected or operably associated using one or more wired or wireless links. In other embodiments, components of one or more of wireless communication device 200 may be distributed among multiple or separate devices.

Processor 204 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 204 may execute instructions, for example, of an Operating System (OS) of wireless communication device 200 and/or of one or more suitable clients.

Input unit 206 may include, for example, a keyboard, a keypad, a mouse, a touch-screen, a touch-pad, a track-ball, a stylus, a microphone or, other suitable pointing device or input device. Output unit 208 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 210 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 212 may include, for example, a hard disk drive, a floppy disk drive, a Compact Disk (CD) drive, a CD-ROM drive, a DVD drive, or other suitable removable or non-removable storage units. Memory unit 210 and/or storage unit 212, for example, may store data processed by wireless communication device 200.

In some embodiments, wireless communication unit 202 may include, or may be associated with, one or more antennas 214. Antennas 214 may include any type of antennas suitable for transmitting and/or receiving wireless communication signals, blocks, frames, transmission streams, packets, messages and/or data. For example, antennas 214 may include any suitable configuration, structure and/or arrangement of one or more antenna elements, components, units, assemblies and/or arrays. Antennas 214 may include, for example, antennas suitable for directional communication. For example, antennas 214 may include a phased array antenna, a single element antenna, a set of switched beam antennas, and/or the like. In some embodiments, antennas 214 may implement transmit and receive functionalities using separate transmit and receive antenna elements. In some embodiments, antennas 214 may implement transmit and receive functionalities using common and/or integrated transmit/receive elements.

In some embodiments, wireless communication unit 202 may include, for example, one or more radios 216, for example, including one or more wireless transmitters, receivers and/or transceivers able to send and/or receive wireless communication signals, RF signals, frames, blocks, transmission streams, packets, messages, data items, and/or data. For example, wireless communication unit 202 may include or may be implemented as part of a wireless Network Interface Card (NIC), and the like. Radio 216 performs raw data measurements of wireless communications from one or more fixed location devices such as FTM-TOF measurements or RSSI measurements. The raw data measurements are used by a location engine 218 to calculate a location of wireless communication device 200.

Location engine 218 is able to serve multiple clients simultaneously, calculating multiple location coordinates based on the same or a subset of the same raw data measurements utilizing the location coordinate datasets of one or more fixed location devices. Location engine 218 calculates a custom location per client with respect to the fixed location device's client specific location information that the client has provided or that has been downloaded to wireless device 200. Location engine 218 may utilize any positioning algorithm for location determination such as trilateration, maximum-likelyhood, Kalman Filter and the like.

Figure 3:
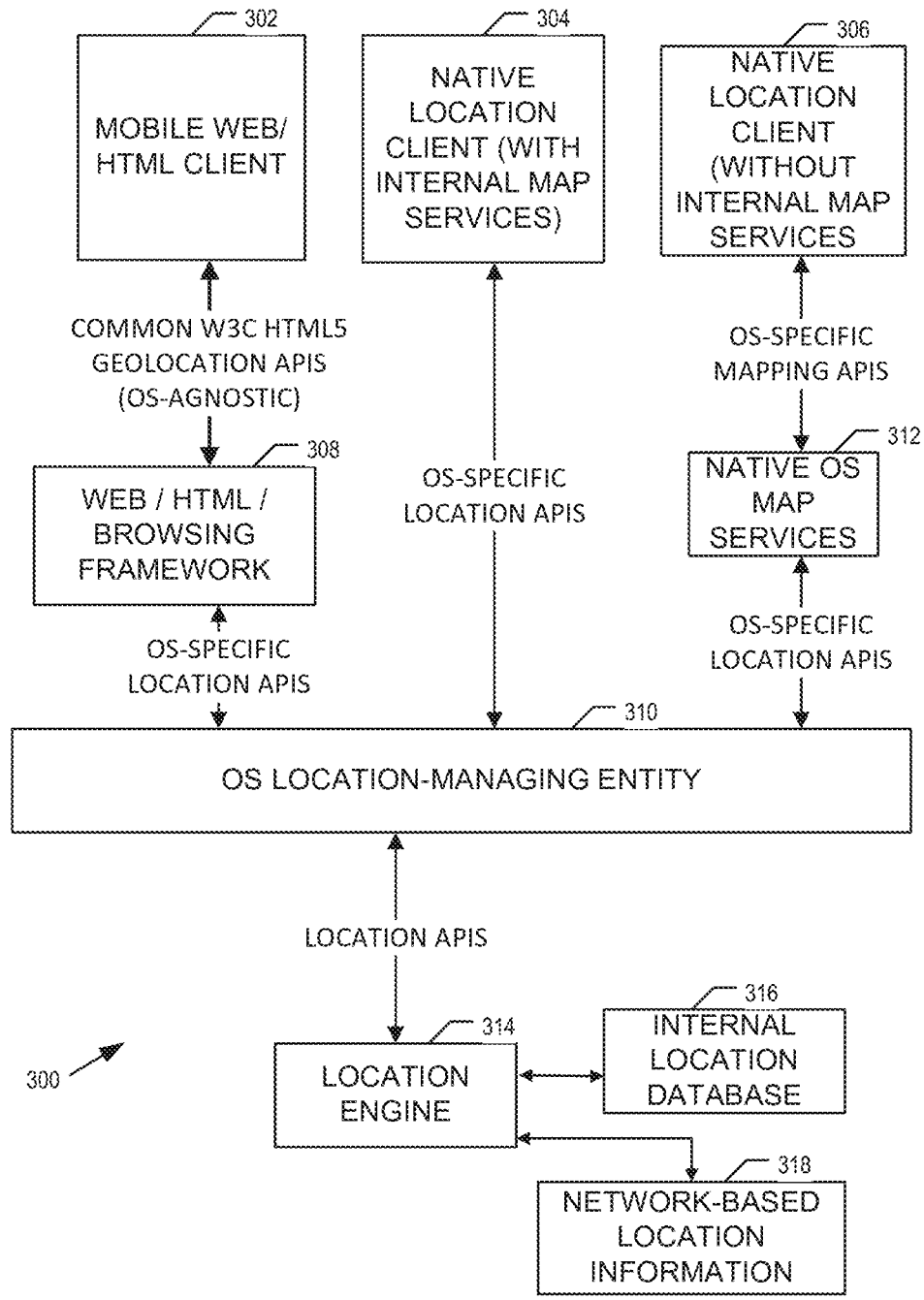
FIG. 3 illustrates a software stack diagram of a wireless communication device in accordance with some embodiments.

FIG. 3 illustrates a software stack diagram 300 of a wireless communication device in accordance with some embodiments. The wireless communication device may have multiple different types of clients that use location information. As illustrated, some of these clients may include a mobile Web/HTML client 302, a native location client (with internal map services) 304, a native map location client (without internal map services) 306, and the like. Each of clients 302-306 may have a custom or tailored indoor location map and coordinates as per their respective preference. Mobile Web/HTML client 302 interfaces with a web/HTML/browsing framework 308 via, for example, common W3C HTML5 GeoLocation APIs (Operating System (OS) agnostic). Web/HTML/browsing framework 308 interfaces with an OS location managing entity 310 via, for example, OS-Specific location APIs. Native location client 304 interfaces directly with OS location managing entity 310 via, for example, OS-Specific location APIs, for example those APIs for Microsoft Windows, Google Chrome, Android, Apple iOS/OSX and the like. Native location client 306 interfaces with native OS map services 312 via, for example, OS-Specific mapping APIs. Native OS map services 312 interfaces with OS location managing entity 310 via, for example, OS-Specific location APIs.

A location engine 314 receives requests for location information of the wireless communication device via the illustrated channels from clients 302-306. Location engine 314 may utilize client specific location coordinate information of the fixed location devices from an internal location database 316 or network-based, for example WiFi, client specific location information 318 to calculate location of the wireless communication device.

According to some embodiments, for clients that use Operating System APIs for example, client specific location coordinate information of the fixed location devices may be obtained after client registration to OS location services, by calling a routine such as SetAPsLocationDatabase retrieving AP/Mac list, Location list, Estimated-Error list. The OS may send this information, as well as a client ID, to the location engine.

According to some embodiments, for clients that use OMA SUPL and/or 3GPP LPPe Location APIs for example, client specific location coordinate information of fixed location devices may be obtained using a network-initiated/mobile-terminated location request procedure such as a call to OMA-LPPe-WLAN-AP-ProvideLocationInformation prior to the request. The location request, such as SUPL INIT or SUPL POS INIT messages, may include an additional optional field to indicate if location request should be served only with this information, or allowed to use other information as well (that may be present on the location engine/device from other clients).

According to some embodiments, for WiFi clients using 802.11 u/k for example, client specific location coordinate information of fixed wireless devices may be obtained using, for example, a LCI request/response or Neighbor List request/response.

Figure 4:
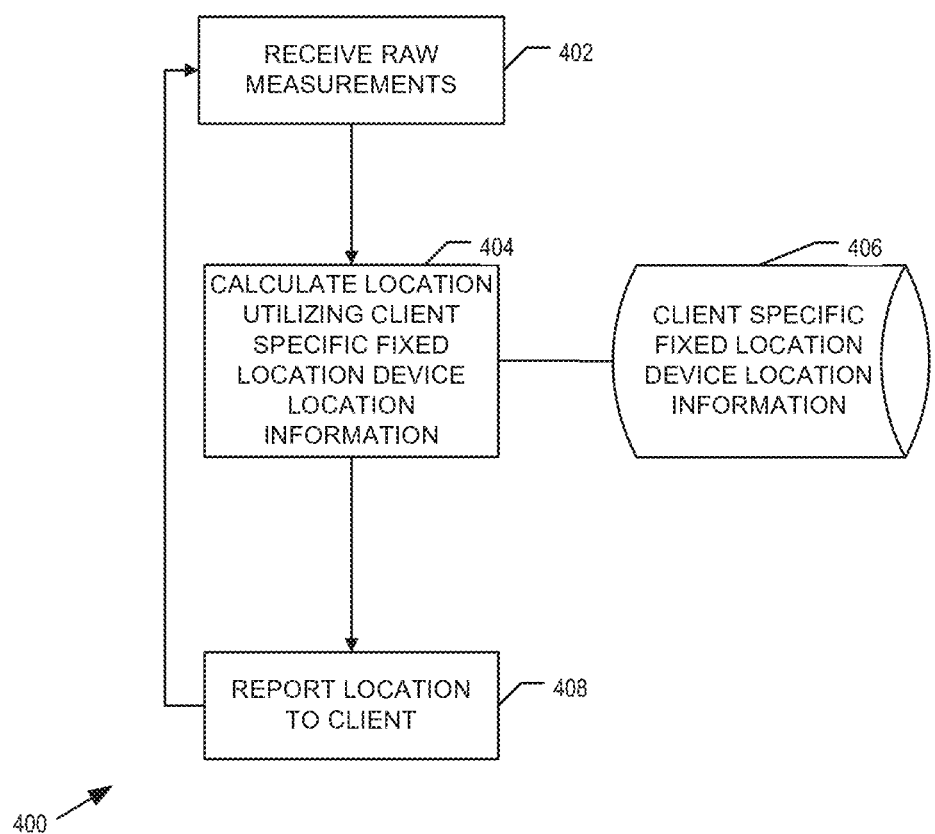
FIG. 4 illustrates a flow diagram of location determination by a location engine in accordance with some embodiments.

FIG. 4 illustrates a flow diagram of location determination by a location engine in accordance with some embodiments. The location engine requests and collects raw data measurements, block 402, for example, RSSI or Time-Of-Flight raw data measurements of communications from one or more fixed location devices to the wireless communication device. The location engine calculates, block 404, one or more locations of the wireless device using the client specific fixed location device location information, block 406, for the respective requesting clients. The location engine then reports, block 408, the location information of the wireless communication device to the requesting client(s) in client specific location coordinates.

In accordance with some embodiments, in order to maintain privacy, security, and trusted-location, the location engine may choose to isolate each client location database, preventing contamination of databases as well as preventing injection of untrusted AP location data and fixed location device measurements by an un-trusted client that may impact another (possibly trusted) client.

In accordance with some embodiments, the location engine may choose to isolate each client location database in case the different location databases have different (or local) error estimations, which may introduce extra error to the location determination if mixed. In such cases the location engine may choose to maintain separate instances, or states, of its location algorithm per client. When new raw measurements arrive, the location engine may use the specific client location database in order to calculate a position.

In accordance with some embodiments, some or all clients may share the same security/privacy/trust/error-estimation characteristics, and the database may not be dynamically-changing every measurement, and the location engine may choose to implement a translation function per-client that translates the client specific location coordinates of the fixed location devices between one client to another (or to a single, "master", coordination grid), while maintaining only a single instance (or state) of the location algorithm and translate the algorithm output per each client.

In accordance with some embodiments, in order to support multiple indoor locations, a location request from a client may include optional fixed location device location information or a unique identifier for the fixed location device location database to be used with the respective request.

In accordance with some embodiments, the location engine may explicitly request fixed location device location information from the client, for example, based on the BSSID/MAC addresses of surrounding fixed location devices.

In accordance with some embodiments, a new method of calculating multiple locations of a wireless communication device based on the same or a subset of the same raw data measurements (such as Time-Of-Flight/Fine-Time-Measurements or RSSI) and client specific fixed location device locations sources and/or database is disclosed. Additionally, new APIs and implementation methods to support the new method are disclosed.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

EXAMPLES

The following examples pertain to further embodiments.

Example 1 includes a wireless communication apparatus, the apparatus including a radio unit to capture multiple data measurements of multiple wireless communications from multiple fixed location devices; and a location engine to calculate a first client specific location of the wireless communication apparatus using at least a first portion of the multiple data measurements and first client specific location information of a corresponding first portion of the multiple fixed location devices and to calculate a second client specific location of the wireless communication apparatus using at least a second portion of the multiple data measurements and second client specific location information of a corresponding second portion of the multiple fixed location devices.

Example 2 includes the subject matter of Example 1, wherein the multiple data measurements are received signal strength indicator (RSSI) measurements.

Example 3 includes the subject matter of any one of Examples 1-2, wherein the multiple data measurements are fine timing measurement (FTM) time of flight (TOF) measurements.

Example 4 includes the subject matter of any one of Examples 1-3, wherein at least one of the multiple fixed location devices is a wireless access point (AP).

Example 5 includes the subject matter of any one of Examples 1-4, wherein at least one of the multiple wireless communications is a WiFi communication.

Example 6 includes the subject matter of any one of Examples 1-5, wherein the location engine performs a single location determination calculation and translates a result into the first client specific location and into the second client specific location.

Example 7 includes the subject matter of any one of Examples 1-6, wherein the location engine performs a first location determination calculation using first client specific coordinates of the corresponding first portion of the multiple fixed location devices and a second location determination calculation using second client specific coordinates of the corresponding second portion of the multiple fixed location devices.

Example 8 includes the subject matter of any one of Examples 1-7, further comprising a memory unit to store the first and second client specific location information of the multiple fixed devices.

Example 9 includes the subject matter of any one of Examples 1-8, wherein the first client specific location information of the multiple fixed devices corresponds to a local map of the first client.

Example 10 includes the subject matter of any one of Examples 1-9, wherein the first client specific location information of the multiple fixed devices corresponds to a local map of the first client and at least one other client.

Example 11 includes the subject matter of any one of Examples 1-10, wherein the at least first portion of the data measurements and the at least second portion of the data measures are the same data measurements.

Example 12 includes the subject matter of any one of Examples 1-11, wherein the at least first portion of the data measurements and the at least second portion of the data measures contain some but not all of the same data measurements.

Example 13 includes the subject matter of any one of Examples 1-12, wherein the first client specific location information includes first client specific location coordinates and first client specific error estimations.

Example 14 includes the subject matter of any one of Examples 1-13, wherein the first client specific location coordinates are to be downloaded from the multiple fixed location devices.

Example 15 includes a wireless communication device, the device comprising a radio unit to capture multiple data measurements of multiple wireless communications from multiple fixed location devices; a first client to request first client specific location information of the wireless communication device; a second client to request second client specific location information of the wireless communication device; a location engine to calculate the first client specific location using at least a first portion of the multiple data measurements and first client specific location information of a corresponding first portion of the multiple fixed location devices and to calculate the second client specific location using at least a second portion of the multiple data measurements and second client specific location information of a corresponding second portion of the multiple fixed location devices.

Example 16 includes the subject matter of Example 15, wherein the multiple data measurements are received signal strength indicator (RSSI) measurements.

Example 17 includes the subject matter of any one of Examples 15-16, wherein the multiple data measurements are fine timing measurement (FTM) time of flight (TOF) measurements.

Example 18 includes the subject matter of any one of Examples 15-17, wherein at least one of the multiple fixed location devices is a wireless access point (AP).

Example 19 includes the subject matter of any one of Examples 15-18, wherein at least one of the multiple wireless communications is a WiFi communication.

Example 20 includes the subject matter of any one of Examples 15-19, wherein the location engine performs a single location determination calculation and translates a result into the first client specific location and into the second client specific location.

Example 21 includes the subject matter of any one of Examples 15-20, wherein the location engine performs a first location determination calculation using first client specific coordinates of the corresponding first portion of the multiple fixed location devices and a second location determination calculation using second client specific coordinates of the corresponding second portion of the multiple fixed location devices.

Example 22 includes the subject matter of any one of Examples 15-21, further comprising a memory unit to store the first and second client specific location information of the multiple fixed devices.

Example 23 includes the subject matter of any one of Examples 15-22, wherein the first client specific location information of the multiple fixed devices corresponds to a local map of the first client.

Example 24 includes the subject matter of any one of Examples 15-23, wherein the first client specific location information of the multiple fixed devices corresponds to a local map of the first client and another local map of at least one other client.

Example 25 includes the subject matter of any one of Examples 15-24, wherein the at least first portion of the data measurements and the at least second portion of the data measures are the same data measurements.

Example 26 includes the subject matter of any one of Examples 15-25, wherein the at least first portion of the data measurements and the at least second portion of the data measures contain some but not all of the same data measurements.

Example 27 includes the subject matter of any one of Examples 15-26, wherein the first client specific location information includes first client specific location coordinates and first client specific error estimations.

Example 28 includes the subject matter of any one of Examples 15-27, wherein the first client specific location coordinates are to be downloaded from the multiple fixed location devices.

Example 29 includes the subject matter of any one of Examples 15-28, wherein the first client is a mobile web/HTML client and the second client is a native location client with internal map services.

Example 30 includes a method of wireless communication of a wireless communication device, the method comprising measuring multiple wires communications from multiple fixed location devices obtaining multiple data measurements; receiving a request from a first client for first client specific location information of the wireless communication device; receiving a request from a second client for second client specific location information of the wireless communication device; calculating the first client specific location using at least a first portion of the multiple data measurements and first client specific location information of a corresponding first portion of the multiple fixed location devices and calculating the second client specific location using at least a second portion of the multiple data measurements and second client specific location information of a corresponding second portion of the multiple fixed location devices.

Example 31 includes the subject matter of Example 30, wherein the multiple data measurements are received signal strength indicator (RSSI) measurements.

Example 32 includes the subject matter of any one of Examples 30-31, wherein the multiple data measurements are fine timing measurement (FTM) time of flight (TOF) measurements.

Example 33 includes the subject matter of any one of Examples 30-32, wherein at least one of the multiple fixed location devices is a wireless access point (AP).

Example 34 includes the subject matter of any one of Examples 30-33, wherein at least one of the multiple wireless communications is a WiFi communication.

Example 35 includes the subject matter of any one of Examples 30-34, wherein the calculating comprises performing a single location determination calculation and translating a result into the first client specific location and into the second client specific location.

Example 36 includes the subject matter of any one of Examples 30-35, wherein the calculating comprises performing a first location determination calculation using first client specific coordinates of the corresponding first portion of the multiple fixed location devices and a second location determination calculation using second client specific coordinates of the corresponding second portion of the multiple fixed location devices.

Example 37 includes the subject matter of any one of Examples 30-36, further storing the first and second client specific location information of the multiple fixed devices in a memory unit.

Example 38 includes the subject matter of any one of Examples 30-37, wherein the first client specific location information of the multiple fixed devices corresponds to a local map of the first client.

Example 39 includes the subject matter of any one of Examples 30-38, wherein the first client specific location information of the multiple fixed devices corresponds to a local map of the first client and another local map of at least one other client.

Example 40 includes the subject matter of any one of Examples 30-39, wherein the at least first portion of the data measurements and the at least second portion of the data measures are the same data measurements.

Example 41 includes the subject matter of any one of Examples 30-40, wherein the at least first portion of the data measurements and the at least second portion of the data measures contain some but not all of the same data measurements.

Example 42 includes the subject matter of any one of Examples 30-41, wherein the first client specific location information includes first client specific location coordinates and first client specific error estimations.

Example 43 includes the subject matter of any one of Examples 30-42, further comprising downloading the first client specific location coordinates from the multiple fixed location devices.

Example 44 includes the subject matter of any one of Examples 30-43, wherein the first client is a mobile web/HTML client and the second client is a native location client with internal map services.

Example 45 includes a computer-readable non-transitory storage medium that contains instructions, which when executed by one or more processors result in performing the operations of any of Examples 30-44.

Example 46 includes a wireless communications device having a processor, a memory, and a radio, the device adapted to perform the operations of any of Examples 30-44.

Example 47 includes a wireless communications device having means for performing the operations any of Examples 30-44.

The foregoing description is intended to be illustrative and not limiting. Variations will occur to those of skill in the art. Those variations are intended to be included in the various embodiments of the invention, which are limited only by the scope of the following claims.

What is claimed is:

1. A wireless communication apparatus comprising:
a radio unit to capture multiple data measurements of multiple wireless communications from multiple fixed location devices; and
a location engine to calculate a first client specific location of the wireless communication apparatus using at least a first portion of the multiple data measurements and first client specific location information of a corresponding first portion of the multiple fixed location devices,
the location engine to calculate a second client specific location of the wireless communication apparatus using at least a second portion of the multiple data measurements and second client specific location information of a corresponding second portion of the multiple fixed location devices;
wherein the first client specific location relates to a first client application associated with the wireless communication device and the second client specific location relates to a second client application associated with the wireless communication apparatus and wherein the first client specific location and the second client specific location are calculated substantially simultaneously.

2. The wireless communication apparatus of claim 1, wherein the multiple data measurements are received signal strength indicator (RSSI) measurements.

3. The wireless communication apparatus of claim 1, wherein the multiple data measurements are fine timing measurement (FTM) time of flight (TOF) measurements.

4. The wireless communication apparatus of claim 1, wherein at least one of the multiple fixed location devices is a wireless access point (AP).

5. The wireless communication apparatus of claim 1, wherein at least one of the multiple wireless communications is a WiFi communication.

6. The wireless communication apparatus of claim 1, wherein the location engine performs a single location determination calculation and translates a result into the first client specific location and into the second client specific location.

7. The wireless communication apparatus of claim 1, wherein the location engine performs a first location determination calculation using first client specific coordinates of the corresponding first portion of the multiple fixed location devices and a second location determination calculation using second client specific coordinates of the corresponding second portion of the multiple fixed location devices.

8. The wireless communication apparatus of claim 1, further comprising a memory unit to store the first and second client specific location information of the multiple fixed devices.

9. The wireless communication apparatus of claim 1, wherein the first client specific location information of the multiple fixed devices corresponds to a local map of the first client.

10. The wireless communication apparatus of claim 9, wherein the first client specific location information of the multiple fixed devices corresponds to a local map of the first client and at least one other client.

11. The wireless communication apparatus of claim 1, wherein the at least first portion of the data measurements and the at least second portion of the data measures are the same data measurements.

12. The wireless communication apparatus of claim 1, wherein the at least first portion of the data measurements and the at least second portion of the data measures contain some but not all of the same data measurements.

13. The wireless communication apparatus of claim 1, wherein the first client specific location information includes first client specific location coordinates and first client specific error estimations.

14. The wireless communication apparatus of claim 1, wherein the first client specific location coordinates are to be downloaded from the multiple fixed location devices.

15. A wireless communication device comprising:
a radio unit to capture multiple data measurements of multiple wireless communications from multiple fixed location devices;
a first client to request first client specific location information of the wireless communication device;
a second client to request second client specific location information of the wireless communication device; and
a location engine to calculate the first client specific location using at least a first portion of the multiple data measurements and first client specific location information of a corresponding first portion of the multiple fixed location devices, the location engine to calculate to calculate the second client specific location using at least a second portion of the multiple data measurements and second client specific location information of a corresponding second portion of the multiple fixed location devices;
wherein the first client specific location relates to a first client application associated with the wireless communication device and the second client specific location relates to a second client application associated with the wireless communication apparatus and wherein the first client specific location and the second client specific location are calculated substantially simultaneously.

16. The wireless communication device of claim 15, wherein at least one of the multiple wireless communications is a WiFi communication.

17. The wireless communication device of claim 15, wherein the location engine performs a single location determination calculation and translates a result into the first client specific location and into the second client specific location.

18. The wireless communication device of claim 15, wherein the location engine performs a first location determination calculation using first client specific coordinates of the corresponding first portion of the multiple fixed location devices and a second location determination calculation using second client specific coordinates of the corresponding second portion of the multiple fixed location devices.

19. The wireless communication device of claim 15, further comprising a memory unit to store the first and second client specific location information of the multiple fixed devices.

20. The wireless communication device of claim 15, wherein the first client specific location information of the multiple fixed devices corresponds to a local map of the first client.

21. The wireless communication device of claim 15, wherein the first client is a mobile web/HTML client and the second client is a native location client with internal map services.

22. A method of wireless communication of a wireless communication device comprising:
measuring multiple radio communications from multiple fixed location devices obtaining multiple data measurements;
receiving a request from a first client for first client specific location information of the wireless communication device;
receiving a request from a second client for second client specific location information of the wireless communication device; and
calculating the first client specific location using at least a first portion of the multiple data measurements and first client specific location information of a corresponding first portion of the multiple fixed location devices and calculating the second client specific location using at least a second portion of the multiple data measurements and second client specific location information of a corresponding second portion of the multiple fixed location devices;
wherein the first client specific location relates to a first client application associated with the wireless communication device and the second client specific location relates to a second client application associated with the wireless communication apparatus and wherein the first client specific location and the second client specific location are calculated substantially simultaneously.

23. The method of wireless communication of claim 22, wherein the calculating comprises performing a single location determination calculation and translating a result into the first client specific location and into the second client specific location.

24. The method of wireless communication of claim 22, wherein the calculating comprises performing a first location determination calculation using first client specific coordinates of the corresponding first portion of the multiple fixed location devices and a second location determination calculation using second client specific coordinates of the corresponding second portion of the multiple fixed location devices.

25. The method of wireless communication of claim 22, further storing the first and second client specific location information of the multiple fixed devices in a memory unit.

* * * * *